Patented Apr. 11, 1950

2,504,067

UNITED STATES PATENT OFFICE 2,504,067

PROCESS FOR PRODUCTION OF STREPTOMYCIN USING FERMENTATION SOLUBLES

Donald R. Colingsworth, Kalamazoo, Mich., assignor to The Upjohn Company, Kalamazoo, Mich., a corporation of Michigan No Drawing. Application February 18, 1946, Serial No. 648,562

4 Claims. (Cl. 195—80)

This invention relates to the production of streptomycin and is particularly concerned with an improvement in culture media used in the production of streptomycin by fermentation procedures.

Streptomycin is obtained by inoculating a sterilized nutrient medium with a microorganism capable of producing the same and aerobically fermenting the culture for a suitable period of time, usually about 48–96 hours. The microorganism commonly employed is Actinomyces (Streptomyces) griseus, which is seeded in the medium in amount of about five per cent of the total volume of the medium. The medium commonly used is composed of substances capable of promoting the growth of the organism, and capable of enhancing the production of the antibiotic agent. In addition to the use of certain inorganic salts to provide minerals, an isotonic environment, and nitrogen in the event that the inorganic compound is an ammonium salt; sugars, to provide available carbon, a mixture of modified proteins, comprising peptone and beef extract, has been thought to be indispensable. In the use of such a mixture the peptone provides a source of nitrogen and it is thought that beef extract provides certain non-protein substances which seem to promote the growth of the organism. Therefore, in the use of prior methods it is thought that the presence of both peptone and beef extract is essential in the production of streptomycin. There are, however, serious objections to the use of beef extract and peptone in such media as they contain undesirable products which are difficult to separate from the antibiotic agent because of their close similarity in certain physical properties to the antibiotic agent, and which lower the purity of the product obtainable from the brew. The presence of such undesirable substances in the antibiotic agent is objectionable due to their effects upon parenteral administration. Further, beef extract is expensive.

I have accordingly directed my investigation toward finding a substance capable of replacing substances of high protein content in culture media, and having the ability to produce streptomycin in high yield. I have now discovered and invented a medium capable of use for the production of streptomycin in high yield wherein a substance is used which replaces the usual protein employed. I have now discovered a substance which will promote the growth of the organism and will enhance the production of streptomycin when the same is incorporated in media free of high protein substances. The substance above-mentioned is commonly known as "fermentation solubles" and is obtained as a waste product from aliphatic alcohol fermentation processes wherein cane molasses is used. One common material of this description well known to the trade contains about one-quarter mineral ash, about one-half carbohydrate, about one-eighth protein, and is unusually rich in vitamin B complex.

I have found that, by incorporating a small amount of fermentation solubles in a medium containing no other protein, I am able consistently to produce streptomycin in high yield.

I have further found that by the use of such a medium, containing fermentation solubles, the separation of streptomycin is readily accomplished and the final product contains substantially no toxic substances in contrast to the product obtained by prior procedures. In the treatment of certain pathological conditions with streptomycin it is frequently necessary to extend such treatment for several weeks. In such instances the materials administered must be particularly free of toxic substances. I have found that by the use of my improved medium and procedure I am able to produce a material meeting the above requirements.

The amount of fermentation solubles that I prefer to use in a medium is between about 0.5 and about 1.5 grams per liter of medium. A typical analysis of a commercially available fermentation solubles is: 27 per cent mineral ash, 56 per cent carbohydrate, 12.5 per cent protein and 215 micrograms per gram of vitamin B complex.

A representative medium for the production of streptomycin is as follows: dextrose or other carbohydrate, about 1.0 per cent, to provide carbon for the metabolism of the organism; ammonium sulfate, or other ammonium salt, about 0.25 per cent, to provide a partial source of nitrogen; sodium chloride, about 0.5 per cent, to provide the principal source of isotonicity; potassium hydrogen phosphate, or other buffering agent, about 0.1 per cent, $MgSO_4 \cdot 7H_2O$ about 0.025 per cent and other inorganic salts to provide minerals; fermentation solubles, about 0.1 per cent, to provide for growth of the organism and enhance streptomycin production; and the balance water; and a small amount of mild antiacid, for example, calcium carbonate, about 0.4 per cent. The calcium carbonate is suspended in a small amount of water, sterilized in a separate container, and is added aseptically to the main portion of the cooled sterilized medium before or during the fermentation period. The calcium carbonate is employed in amount sufficient substantially to neutralize the acidity during that portion of the fermentation period when the carbohydrates are being consumed by the organism, and to substantially neutralize the sulfuric acid formed in the consumption of the ammonium sulfate.

The following example illustrates my invention but is not to be construed as limiting the same:

About 100 liters of liquid culture medium was prepared comprising the following ingredients: 1000 grams dextrose; 250 grams ammonium sulfate; 500 grams sodium chloride; 100 grams potassium hydrogen phosphate; 25 grams $MgSO_4 \cdot 7H_2O$; 100 grams fermentation solubles; and sufficient tap water to make up about 100 liters. In a separate container 400 grams of calcium carbonate was suspended in about 1500 milliliters of water. The medium and the calcium carbonate suspension were sterilized separately by autoclaving for 30 minutes at about 15 pounds steam pressure. The medium was cooled, the calcium carbonate suspension was added thereto, and seeded with about 5 liters of a three-day-old culture of *Actinomyces griseus* grown on a suitable medium.

The incubation was carried out at 22–24 degrees centigrade and the brew was vigorously agitated and aerated by the passage of air therethrough at a rate of about one cubic foot per liter per hour. After 70 hours the fermentation was stopped. The product contained about 14 grams of streptomycin averaging 500 units per milligram as tested by current assay.

While I employ fermentation solubles in media containing no other protein I wish also to include in the embodiment of my invention the use of fermentation solubles in media containing other protein, although there is no particular advantage in the use of the latter media.

Various modifications may be made in the method of the present inventon without departing from the spirit or scope thereof, and it is to be understood that I limit myself only as defined in the appended claims.

I claim:

1. A process for the production of streptomycin by a fermentation procedure, which comprises: growing *Streptomyces griseus* on a nutrient medium containing fermentation solubles obtained from the fermentation of cane molasses, as a growth-promoting and streptomycin-production-stimulating factor, and isolating the streptomycin thus produced.

2. A process for the production of streptomycin by a fermentation procedure, which comprises: growing *Streptomyces griseus* on an aqueous carbohydrate containing nutrient medium containing fermentation solubles, as a growth-promoting and streptomycin-production-stimulating factor, and isolating the streptomycin thus produced.

3. A process for the production of streptomycin by a fermentation procedure, which comprises: growing *Streptomyces griseus* on a nutrient medium containing as a growth-promoting and streptomycin-production-stimulating factor, fermentation solubles in an amount between about 0.5 and 1.5 per cent in a medium containing carbohydrate about 1.0 per cent, an ammonium salt about 0.25 per cent, sodium chloride about 0.5 per cent, a buffering agent about 1.1 per cent, $MgSO_4 \cdot 7H_2O$ about 0.25 per cent, and water q. s.

4. A process for the production of streptomycin by fermentation which comprises cultivation of a streptomycin-producing strain of *Streptomyces griseus* on an aqueous fermentable carbohydrate-containing medium that contains fermentation solubles obtained from fermentation of cane molasses and a nontoxic ammonium salt as a source of nitrogen and that is essentially free of other proteins and protein hydrolytic products.

DONALD R. COLINGSWORTH.

REFERENCES CITED

The following references are of record in the file of this patent:

UNITED STATES PATENTS

| Number | Name | Date |
|---|---|---|
| 1,460,736 | Takamine | July 3, 1923 |
| 2,098,199 | Stiles | Nov. 2, 1937 |
| 2,107,261 | Legg | Feb. 1, 1938 |
| 2,449,866 | Waksman | Sept. 21, 1943 |

OTHER REFERENCES

Schatz et al., Proc. Soc. Exptl. Biol. and Med., Jan. 1944, page 67.

Waksman et al., Jr. Am. Pharmaceutical Ass'n, XXXIV, 11, Nov. 1945, p. 275.

Le Page et al., J. Biol. Chem., 162, No. 1, Jan. 1946, page 163.